(12) United States Patent
Petroff

(10) Patent No.: US 7,031,081 B2
(45) Date of Patent: Apr. 18, 2006

(54) MATTE BOX QUICK ASSEMBLY SYSTEM

(76) Inventor: Robert Petroff, 95 Thorncliffe Park Drive #201, Toronto (CA) M4H 1L7

( * ) Notice: Subject to any disclaimer, the term of this patent is extended or adjusted under 35 U.S.C. 154(b) by 50 days.

(21) Appl. No.: 10/497,650

(22) PCT Filed: Jan. 9, 2002

(86) PCT No.: PCT/CA02/00023

§ 371 (c)(1),
(2), (4) Date: Jun. 4, 2004

(87) PCT Pub. No.: WO03/058316

PCT Pub. Date: Jul. 17, 2003

(65) Prior Publication Data

US 2005/0190461 A1    Sep. 1, 2005

(51) Int. Cl.
*G02B 7/02*    (2006.01)
(52) U.S. Cl. .................. 359/819; 359/611; 359/827
(58) Field of Classification Search ................ 359/819, 359/611
See application file for complete search history.

(56) References Cited

U.S. PATENT DOCUMENTS

| 4,687,312 | A | * | 8/1987 | Navarro | 396/544 |
| 4,901,098 | A | * | 2/1990 | Salles | 396/544 |
| 5,349,411 | A | * | 9/1994 | Beauviala | 396/544 |

* cited by examiner

*Primary Examiner*—Jordan M. Schwartz
*Assistant Examiner*—Jessica Stultz

(57) ABSTRACT

An optical filters quick assembly support system or a "Matte Box" as it is known in the film industry, supporting plurality of no-tool, quick-change, snap-on, independently 360°-rotating filter-holder stages, allowing freedom of operation in the horizontal, vertical and rotational planes. A mount base ring having an internal circular coupling slot at one face for attaching the desired number of filter-holder stages serves as an initial receiving unit. The same mount ring having two slidable and lockable brackets for connecting a sunshade in an adjustable manner, assembled to it. Filter-holder stages consisting of a ring having the same internal circular coupling slot as the mount base ring at one face and one stationary and one spring-loaded filter-holder guide attached to the opposite face. The filter-holder guides having a corresponding to the coupling slot semi-circular sliding ribs for coupling with the mount base ring or any additional filter-holder stage.

1 Claim, 7 Drawing Sheets

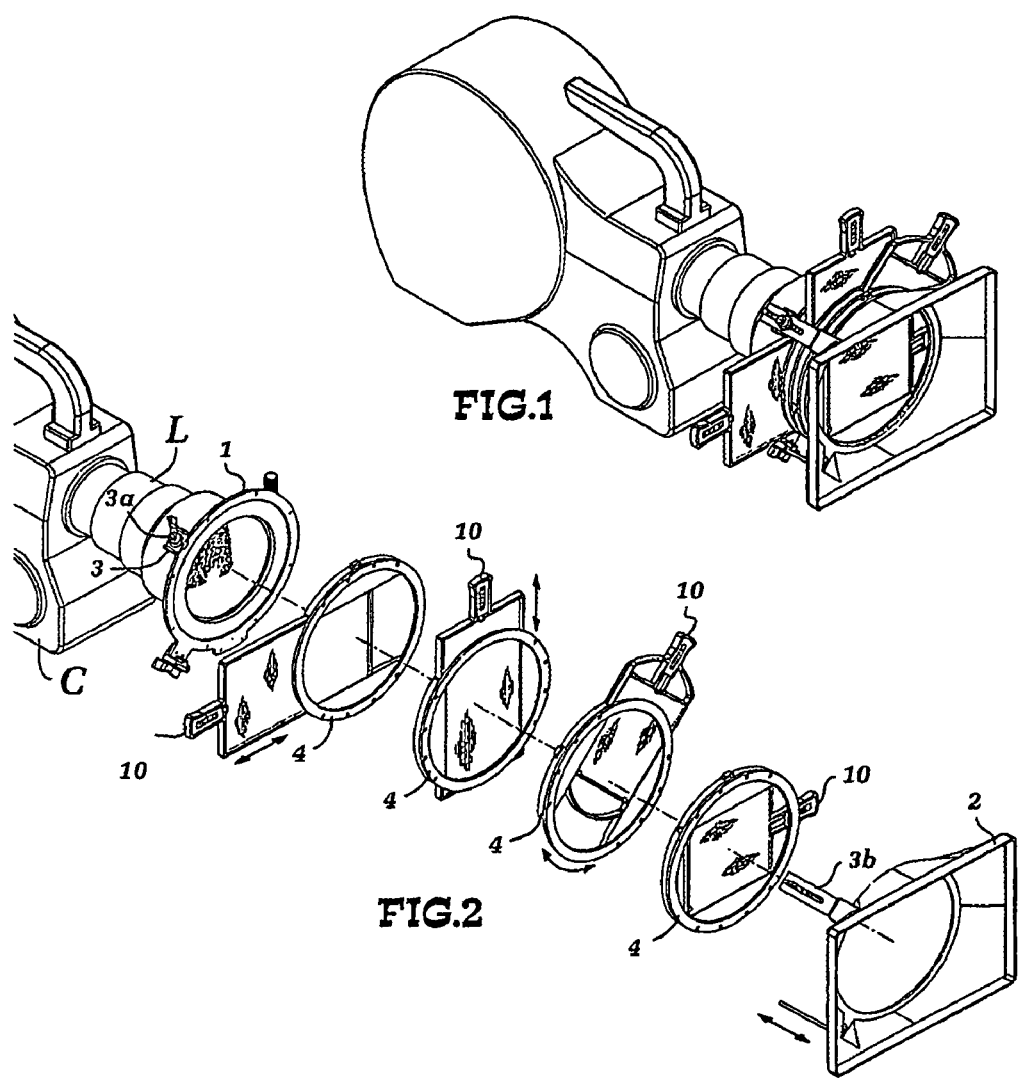

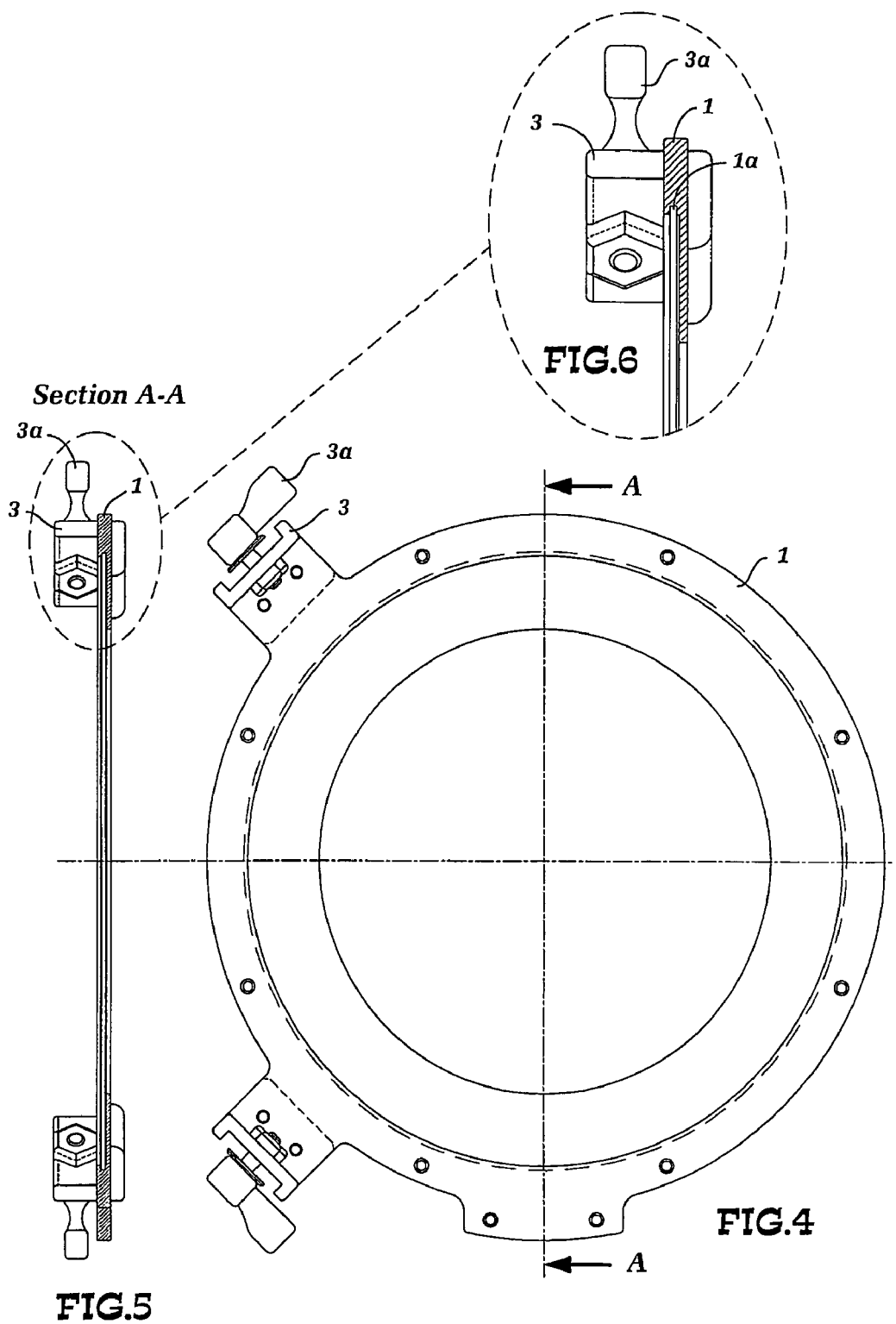

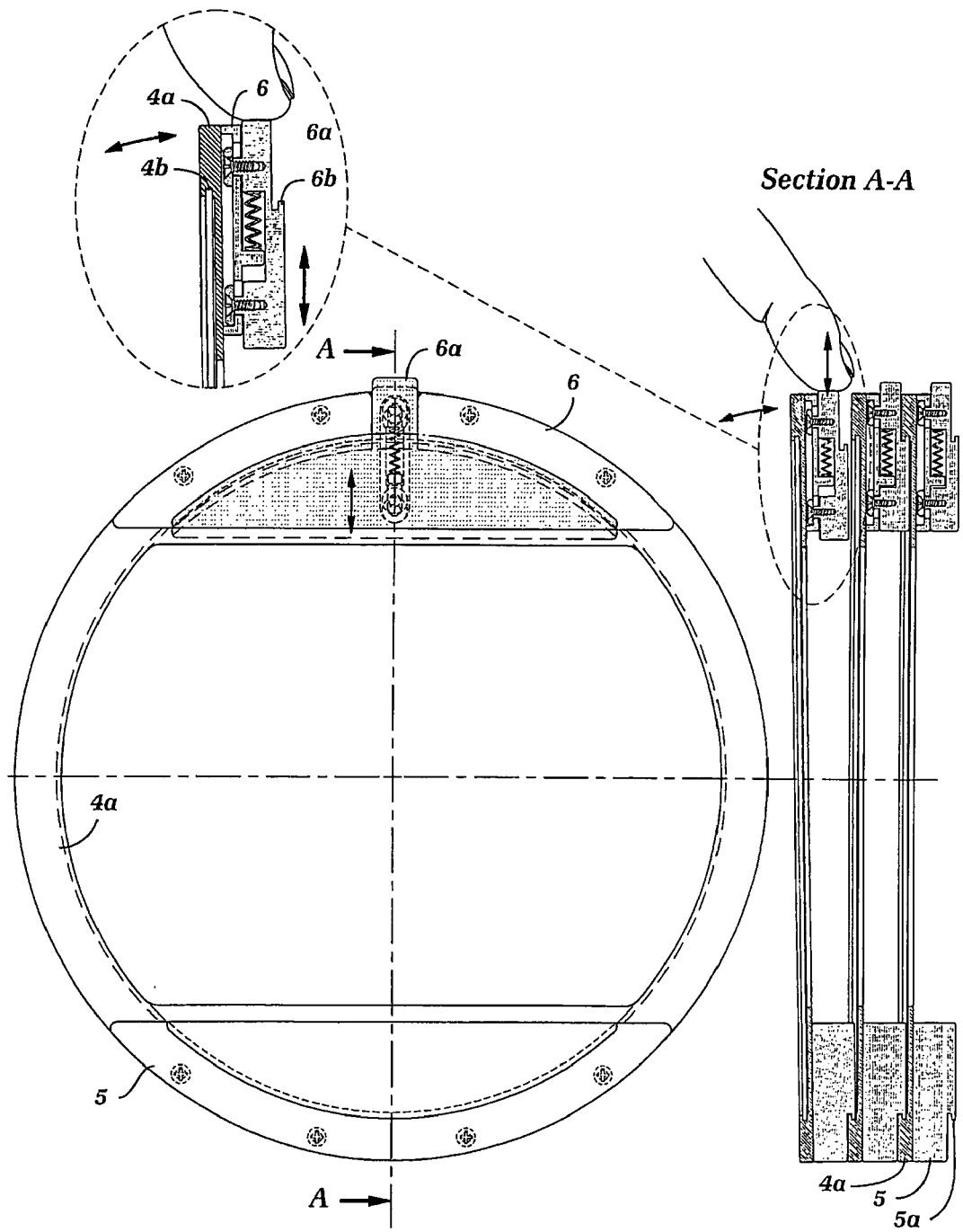

MATTE BOX QUICK ASSEMBLY SYSTEM

BACKGROUND OF THE INVENTION

The subject of the present invention relates to an optical filters quick assembly support system, or a "Matte Box" as it is known in the professional film industry, for use on a motion picture or professional video cameras requiring, in many cases during the filming of a motion picture, the use of a variety of different optical filter effects in order to achieve the desired high quality motion picture.

It is a standard practice in the professional motion picture industry to employ several different types of optical filters within a matte box in front of a camera lens to produce the desired quality of picture or other visual effects.

The optical filters may be of several different types including polarizing filters that require rotation about the lens axis, or long graduated filters requiring freedom of movement in the vertical or horizontal planes.

During the filming process, in order to achieve the necessary optical effects, what becomes necessary is the constant changing of filters and adding or removing of filter-holder stages. Since the costs per minute of a professional movie production are enormously high, the ideal matte box assembly would be one that will allow all this manipulations to be done in seconds and without the need of any tools.

SUMMARY OF THE INVENTION

Therefore, the object of this invention is to advance the art of the matte box assembly systems and to provide a matte box assembly wherein a plurality of filter-holder stages may be rapidly and easily and without tools, assembled, or manipulated to create the desired configuration with the necessary optical characteristics.

More detailed objects and advantages of this invention will appear to those familiar in the profession from the following description and the accompanying drawings.

BRIEF DESCRIPTION OF THE DRAWINGS

FIG. 1 is a perspective view of the matte box assembly mounted to a camera lens with different types of filters shown in standard working condition.

FIG. 2 is an exploded perspective view of this invention showing the components of the matte box assembly and a variety of filter-holders with filters in them, in different working positions.

FIG. 4 is the front view of the mount base ring with the two sliding brackets assembled to it.

FIG. 5 is the cross section of the mount base ring.

FIG. 6 is an enlarged partial view of the cross section of the mount base ring showing the internal coupling slot.

FIG. 9 is the front view of the filter-holder stage assembly with one stationary and one spring-loaded filter-holder guide assembled to it.

FIG. 10 is a cross section of the filter-holder stage assembly of FIG. 9 showing the way the filter-holder stages engage to each other.

FIG. 11 is an enlarged partial section view of the spring-loaded filter-holder guide mechanism.

DETAILED DESCRIPTION OF THE ILLUSTRATED EMBODIMENT

Figure 3:
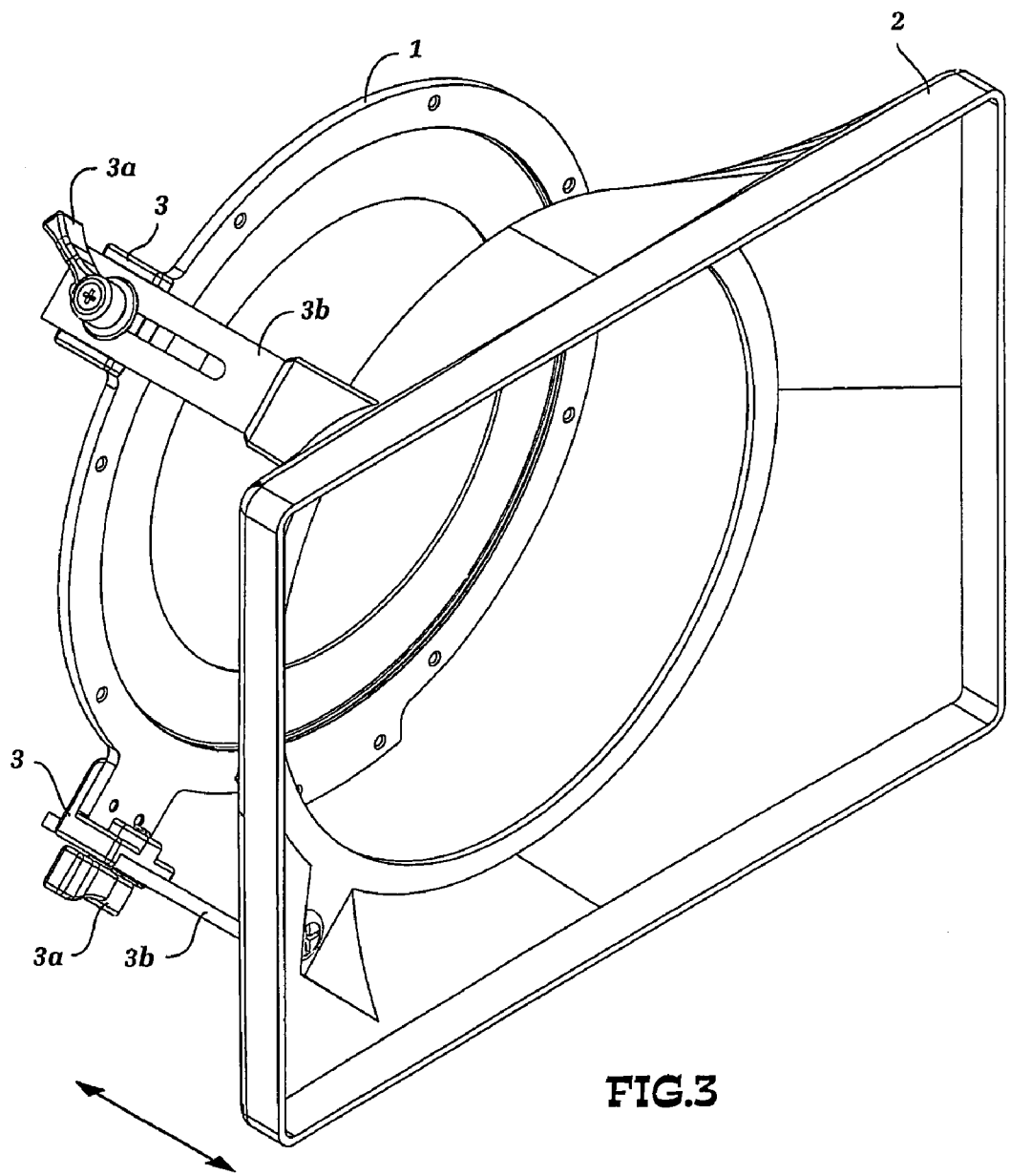
FIG. 3 is a perspective view of the mount base ring and the sunshade connected to each other by way of the sliding brackets.

Referring to FIGS. 1,2,13,14 the matte box assembly is shown mounted on a camera lens L by the means of lens clamp 7, or the camera itself C by the means or bridge plate 8 and bridge plate support 9.

It will readily appear to those familiar with the profession that the invention is applicable to any type of camera or lens that may require a matte box.

The matte box mount base ring, generally designated 1, serves as the base supporting and receiving unit around which the matte box assembly is build—FIGS. 2,3,4 and 12.

The sliding brackets, comprising the part 3 and 3a assembled to the mount ring 1 and the part 3b assembled to the sunshade 2, connect adjustably and lockable the sunshade 2 to the mount ring 1. When connected in this manner, the mount ring 1 and the sunshade 2 form a unit capable of receiving plurality of filter-holder stages 4. The desired adjustment is achieved by unlocking the screw 3a, sliding the sunshade away or closer to the mount ring, and locking it again.

The filter-holder stage 4, (FIGS. 9,10) consists of the ring 4a, one stationary filter-holder guide 5 and one spring-loaded filter-holder guide assembly 6 and 6a and provides the space for receiving a variety of filter-holders 10 with filters in them.

Figure 8:
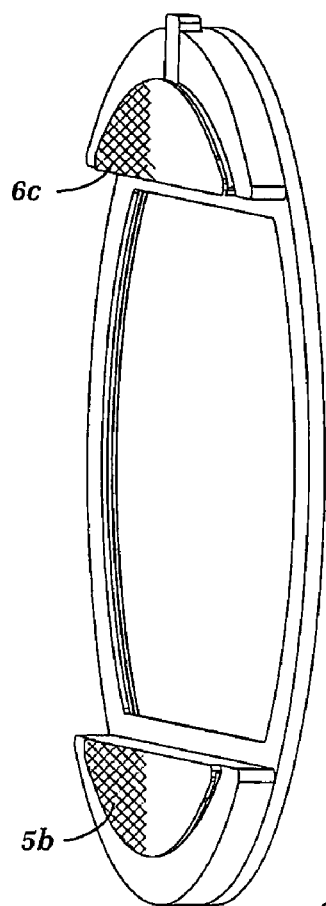
FIG. 8 is a perspective view of the filter-holder stage showing the semi-circular sliding ribs for better understanding of the mechanism.
Figure 7:
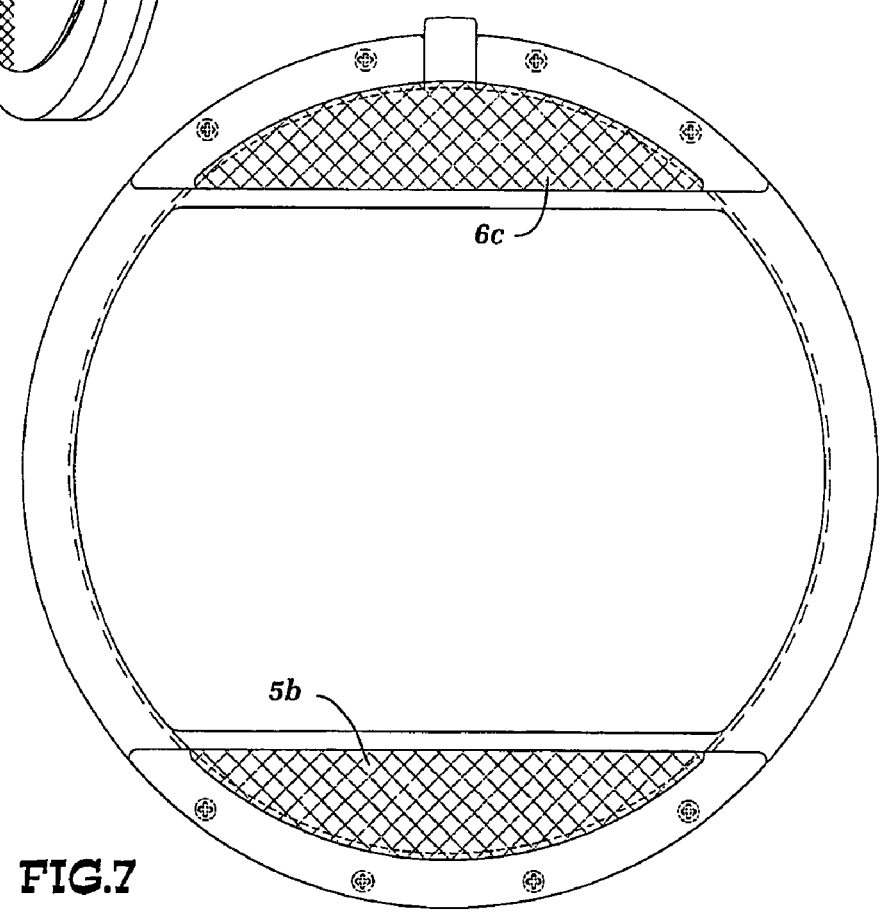
FIG. 7 is a front view of one filter-holder stage where the hatched area represents the semi-circular sliding ribs that engage with the corresponding internal slot of the mount base ring or any filter-holder stage ring.
Figure 12:
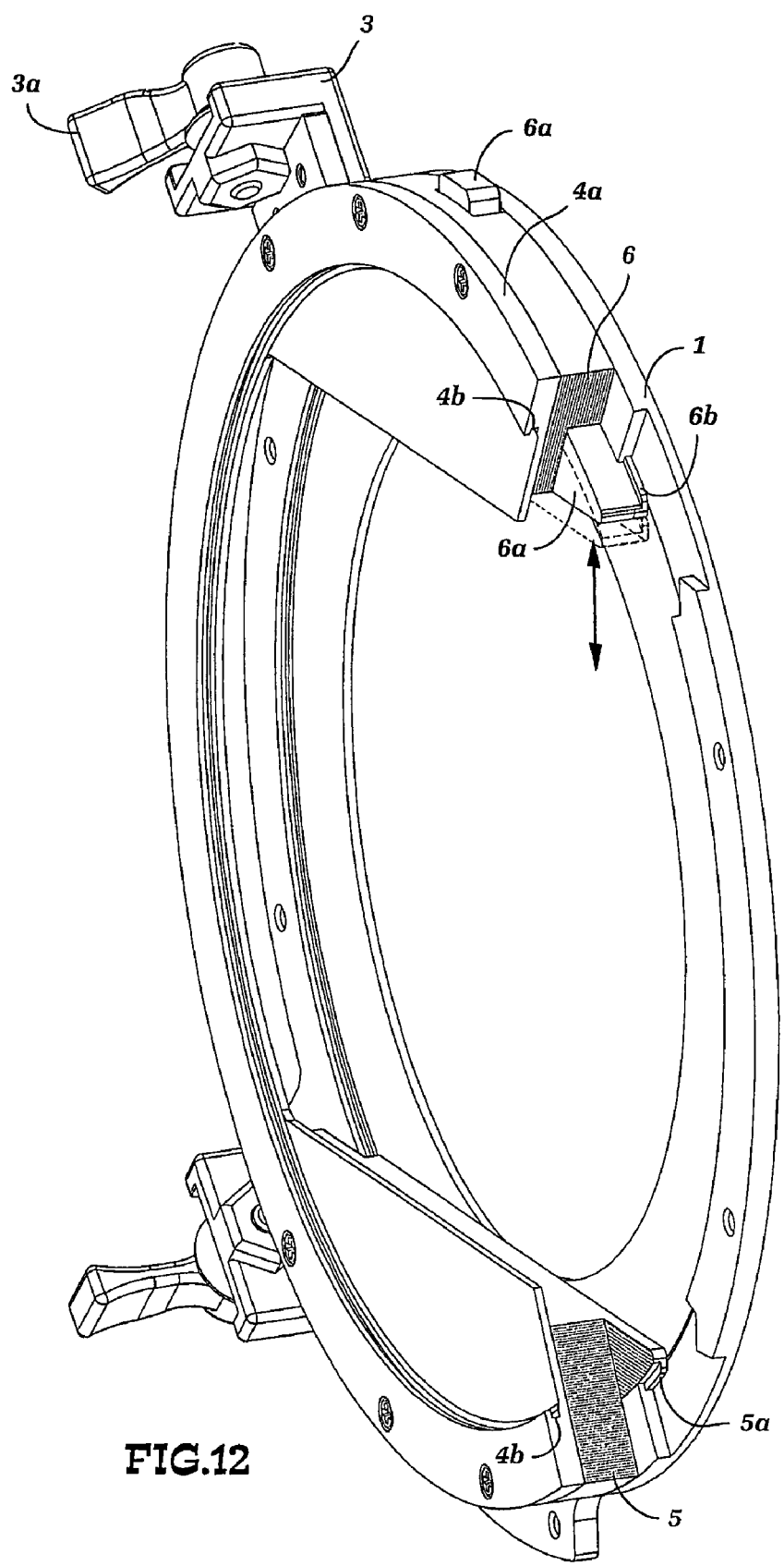
FIG. 12 is partially sectioned perspective view of the mount base ring and a filter-holder stage coupled to it, illustrating the way the components relate to each other.
Figure 13:
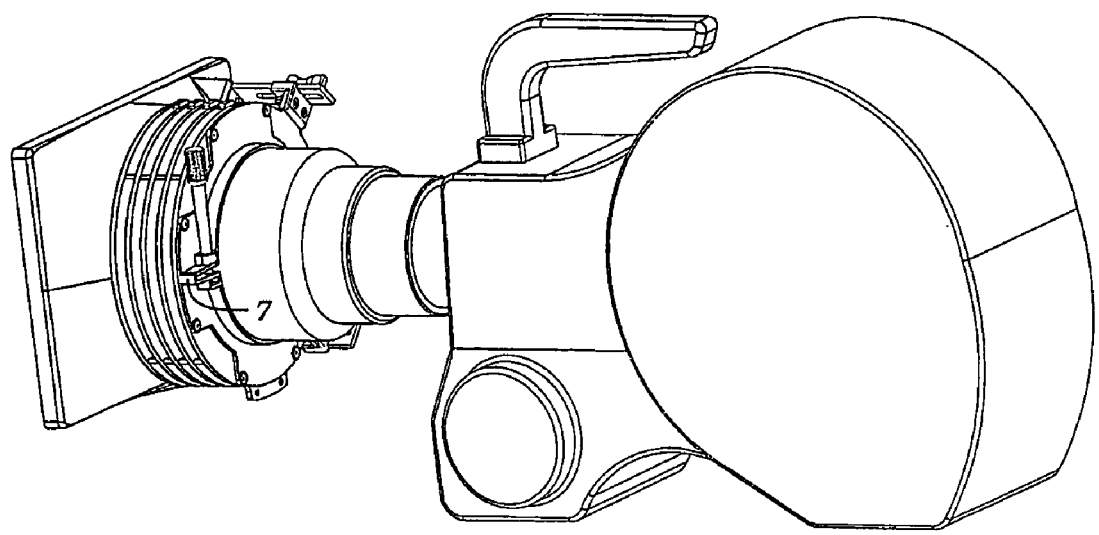
FIG. 13 represents one standard way of mounting the matte box assembly on to the lens of a camera by implementation of a lens clamp.
Figure 14:
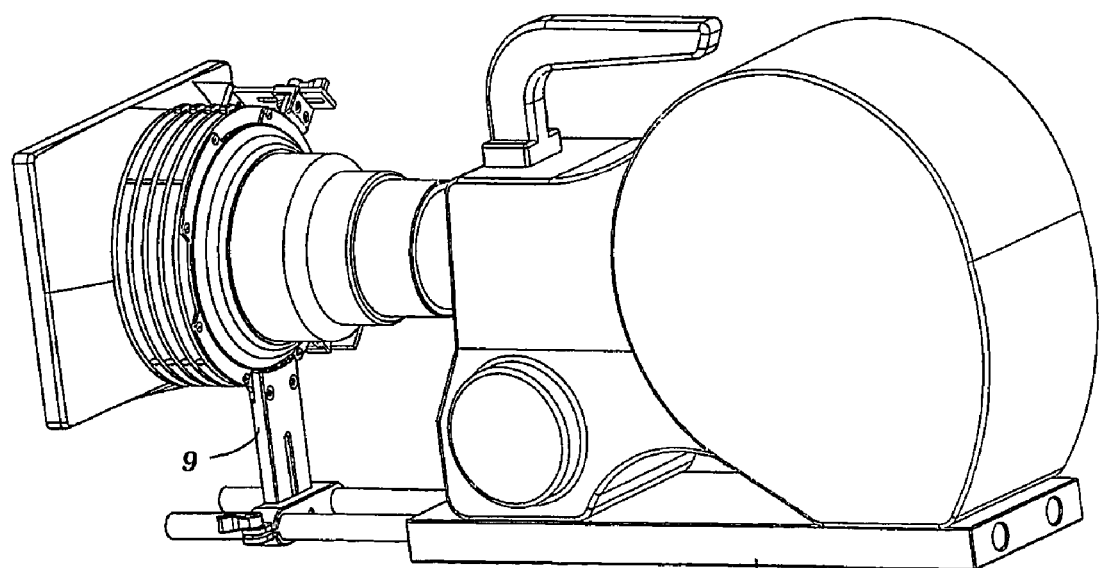
FIG. 14 represents another classical way of mounting the matte box assembly to a camera by the implementation of a bridge plate and bridge plate support assembly.

The identical semi-circular sliding ribs 5b and 6c (FIGS. 7,8) which are part of the filter-holder guides 5 and 6a (FIGS. 7,8,9,10,11) have protruding semi-circular rib that engages in to any of the internal circular coupling slots 1a (FIG. 6) or 4b (FIG. 11) of the mount ring 1 or filter-holder stage ring 4a. When engaged to the mount ring and to each other, the filter-holder stages 4 (FIGS. 2,12) can rotate about the lens ax individually and independently of the remaining modules. In order to achieve the no-tool, quick-change, snap-on characteristic of this invention, the member 6a of the filter-holder guide 6 is spring-loaded and assembled (in any technically suitable manner) slidably to the other member of the filter-holder guide 6 (FIGS. 9,10,11). This way, if a camera operator will have to assemble fast a matte box configuration comprising one, two or more filter-holder stages, he or she engages the sliding rib 5a in to the corresponding slot of the mount ring 1 or already mounted filter-holder stage 4, pushes down the spring-loaded member 6a, moves the filter-holder stage towards the receiving unit and releases it to snap, as shown on FIGS. 9 and 10.

Thus, it will readily appear to the familiar with the profession that this invention provides a matte box assembly that allows for the rapid adding or subtracting of matte box modules without the need of any tools, to provide any desired configuration.

The invention claimed is:
1. A matte box quick assembly system for film or video cameras having a lens comprising:
 a) a mount base ring serving as a base receiving unit, said mount ring having an internal circular coupling slot at one face allowing full rotation of any attached filter-holder stage, said mount ring having two slidable brackets for attaching without tools a sunshade slidably and adjustably,
 b) a filter-holder stage comprising a ring, one stationary and one spring-loaded filter-holder guides, said ring having an internal circular coupling slot allowing for full rotation of any attached additional filter-holder stage, said filter-holder guides having corresponding semi-circular sliding ribs for coupling with the mount base ring or any additional filter-holder stage, said spring-loaded filter-holder guides allowing quick snap-on adding or removing of filter-holder stages without the need of any tools.

* * * * *